United States Patent [19]

Miller

[11] 4,294,141

[45] Oct. 13, 1981

[54] TOOL AND METHOD FOR HOLDING AUTOMOTIVE VALVES CLOSED DURING SERVICING

[76] Inventor: Ronald J. Miller, 4681 Lake Ave., Blasdell, N.Y. 14219

[21] Appl. No.: 89,406

[22] Filed: Oct. 30, 1979

[51] Int. Cl.[3] .......................... B25B 11/00; B23P 19/00

[52] U.S. Cl. .................................. 81/3 R; 254/93 HP; 269/22; 29/252

[58] Field of Search ..................... 81/3 R; 254/93 HP; 269/22, 20; 29/252, 213 R, 213 E, 156.4 R, 426.1, 426.5; 128/677, 686

[56] References Cited

U.S. PATENT DOCUMENTS 3,659,592 5/1972 Natkanski ............................ 128/686

3,929,129 12/1975 Archambault ....................... 128/677

*Primary Examiner*—Roscoe V. Parker

*Attorney, Agent, or Firm*—Christel, Bean & Linihan

[57] ABSTRACT

A tool for engagement with overhead valves to retain them in securely raised positions while working on the valve associated structure to prevent valves from falling into the cylinder when released from such associated structure. The tool has a flexible tube with an inflatable balloon at one end thereof which is projected through a spark plug opening into the combustion chamber and a compressible bulb at the other end of the flexible tube for manually supplying air pressure to said balloon through the tube. The tool includes control valve means for selectively connecting the bulb directly to the balloon for inflating the latter in the combustion chamber to engage the valves and hold them in a raised position and for venting the tube to deflate the balloon and release the valves when the work is complete.

7 Claims, 3 Drawing Figures

10
11
12
13
15
20
21
22
23
24
25
26
30
31
33
34
35
36
38
39
40
41
43
44
46

TOOL AND METHOD FOR HOLDING AUTOMOTIVE VALVES CLOSED DURING SERVICING

BACKGROUND OF THE INVENTION

The present invention relates to a tool for maintaining overhead valves in a raised closed position to permit a workman to remove and replace valve springs, tappets and other valve connections and effect adjustment and repairs to the valve super structure. The closest prior art known to the inventor and his attorney is an ordinary compressed air hose of the type used to inflate tires with a special fitting to permit the same to be connected to the spark plug opening to apply air pressure to the entire interior of an automotive cylinder above the piston and against the valve.

This prior method is effective in general but is subject to certain practical objections. Furthermore, a source of compressed air is not always available to the mechanic and there is a risk of disconnection of the same either at the compressor or at the spark plug opening itself. In any such case, a valve may, upon disconnection from the super-structure, fall into the cylinder and this will require entire disassembly of the cylinder head structure to recover the valve.

Applying relatively high compressed air pressure directly into the combustion chamber as is practiced in the prior art has the additional disadvantage and actual danger in that this air pressure sometimes rotates the engine by continuous pressure on the piston involved and may cause harm to a worker if he happens to be in close contact with the engine fan.

SUMMARY OF THE INVENTION

In the device of the present invention, a tool is provided which is relatively simple and is complete and self contained and may be carried about by a mechanic or kept in his tool box. It requires no external source of air pressure and may therefore be used in emergency roadside repairs and in any other instances where a source of compressed air is not available. This tool comprises generally speaking a tubular member with an inflatable balloon at one end and a bulb at the other for developing air pressure in the tubular member and to the inflatable balloon. The balloon is inserted through the spark plug opening and when inflated bears upwardly against the valves to hold them in a seated position while performing various operations above the cylinder proper.

The end of the tube which is connected to the inflatable balloon preferably has a screw fitting which permits the same to be screwed into a spark plug opening. The opposite end of the flexible tubular member connects with a rubber bulb of the compressible type employed for actuating various instruments and this connection is by means of a valve control member which includes a check valve between the bulb and the control member which permits air flow from the bulb to the control member but prevents retrograde flow.

The control member also includes a manually operable vent valve which is closed when the balloon is being inflated and is maintained in an inflated condition and is opened to vent the passage from the bulb to the balloon when it is desired to withdraw the balloon from the automotive engine. Furthermore, the bulb has a check valve at its end opposite the control member which permits air flow into the compressible bulb but prevents retrograde flow.

DESCRIPTION OF THE ILLUSTRATED EMBODIMENT

Figures 1, 2, 3:
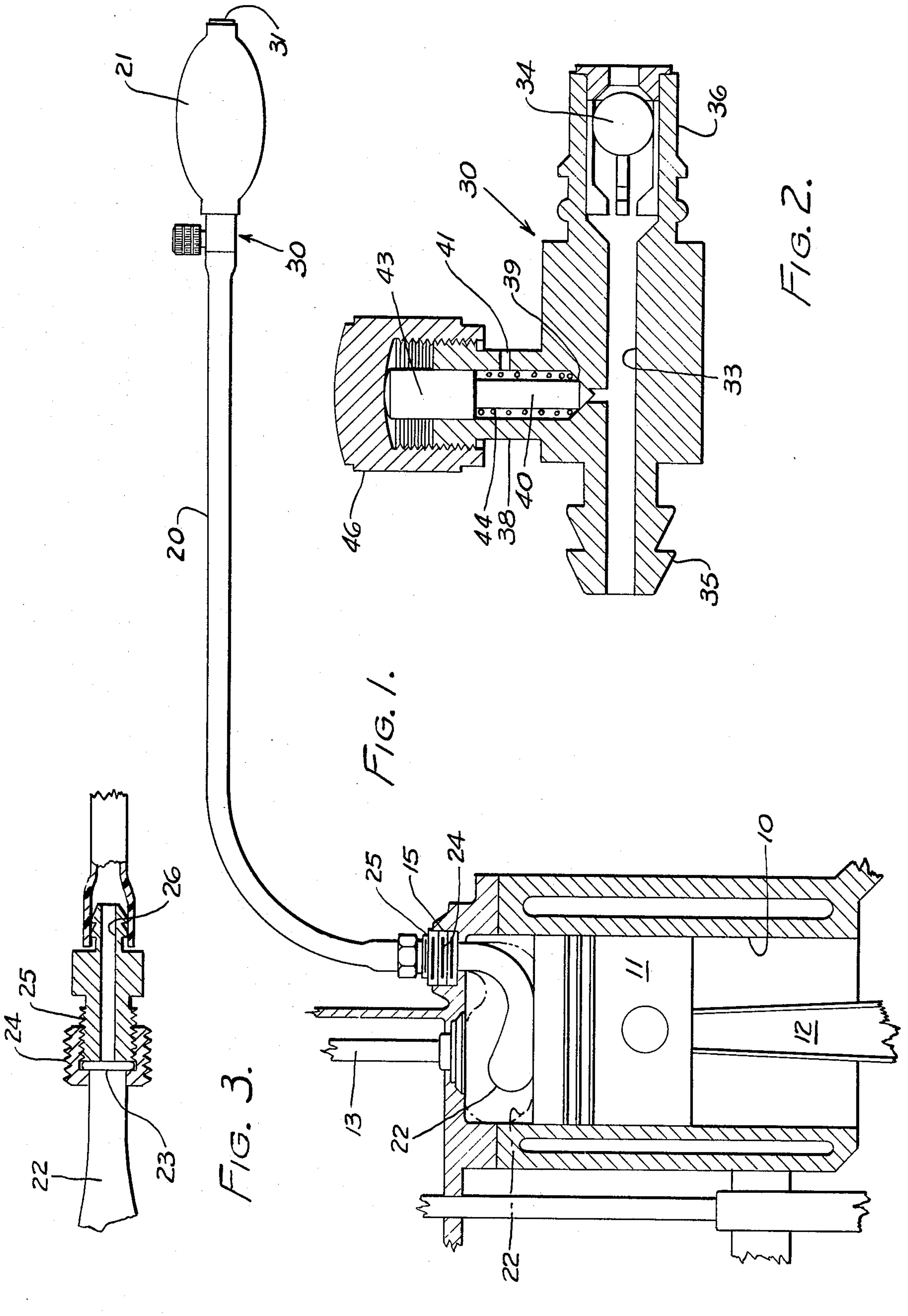
FIG. 1 is a general elevational view of one form of the apparatus of the present invention applied to an automotive cylinder of the overhead valve type with the cylinder shown in cross section and the engine generally shown fragmentarily and somewhat schematically.
FIG. 2 is a longitudinal cross sectional view of the portion of the present apparatus which connects between the pressure bulb and the flexible tube which leads to the spark plug opening of the engine itself.
FIG. 3 is a longitudinal cross sectional view of the portion of the tool which connects the flexible tube and the inflatable balloon to the automotive engine itself.

Referring first to one of the cylinders of an internal combustion engine designated 10 in FIG. 1 and having the usual piston and connecting rod 11 and 12, an overhead valve is shown schematically at 13 and, while various arrangements are possible, it may be assumed for present purposes that a second overhead valve lies directly behind valve 13 in FIG. 1. Valve 13 is shown in an uppermost position, that is a position where both of the overhead valves of a given cylinder are in their seated positions with the piston 11 at its top dead center. In the present instance, the tool of the present invention is applied through the threaded spark plug opening 15 by first removing the spark plug from the opening.

Speaking generally, a balloon element is inserted in the cylinder through the spark plug opening so that it lies between the piston 11 and the upper end of the combustion chamber so that when inflated the balloon holds the valves 13 in their uppermost position so that the connections to the valves may be released without danger of a valve falling down into the cylinder.

Reference will now be had to the novel tool of the present invention and the method by which it is applied to a given automotive cylinder to prevent harmful displacement of an overhead valve or valves. The tool itself generally resembles a sphygmomanometer, particularly with respect to the flexible tube 20 and a bulb 21 which connects with one end of tube 20 and is used for manually developing and applying air pressure to tube 20 as in a sphygmomanometer.

Referring particularly to FIG. 3, an inflatable balloon 22 has a collar 23 at its open end which is contained between adjacent ends of a pair of threaded members 24 and 25. The external thread of member 24 fit into the usual spark plug opening as shown in FIG. 1. The righthand end of member 25 is provided with a nipple 26 which fits snugly within the adjacent end of the flexible tube 20.

The numeral 30 in FIG. 2 indicates generally a connection between the bulb 21 which is used for developing air pressure by manual compression thereof and the adjacent end of the flexible tube 20. The member 30, at its righthand end as viewed in FIGS. 1 and 2, fits snugly within the adjacent end of bulb 21 and the righthand end of bulb 21 as viewed in FIGS. 1 and 2 is provided with a check valve 31 which closes when bulb 21 is compressed and opens when pressure is released from the bulb to permit its reexpansion.

Referring again to the connection 30 which is shown in detail in FIG. 2, the numeral 33 designates an axial bore therethrough which is provided with a check valve 34 at its righthand end as viewed in FIG. 2 which is the end which fits within the adjacent end of bulb 21. This permits air to flow from bulb 21 through the axial bore 33 to tube 20 but prevents retrograde flow to the bulb 21. The lefthand end of member 30 is provided with a nipple formation 35 which fits within the adjacent end of hose 20.

Connection 30 has a radial extension 38 which is axially bored to provide a valve seat 39 which is engaged by valve member 40 whereby the bore 33 of member 30 may be selectively connected with a vent passage 41. Valve 40 has an upper enlargement 43 which receives one end of a compression coil spring 44 and a threaded control member 46 may be screwed downwardly to the closed position illustrated in FIG. 2 or raised to permit the valve to be opened by action of spring 44 to vent passage 33 of the control member 30 to the atmosphere.

A typical embodiment of the present invention has been described herein and shown in the accompanying drawing to illustrate the underlying principles of the invention, but it is to be understood that numerous modifications may be made without departing from the broad spirit and scope of the invention.

I claim:

1. An automotive tool for engagement with overhead valves to retain them in seated positions while working on the valve associated structure which is external of the automotive combustion chamber to prevent valves from falling into said chamber when released from such structure, said tool comprising an elongate tubular member having an inflatable balloon at one end thereof adapted to be projected through a spark plug opening into the combustion chamber, said balloon being of such form as to substantially fully occupy said chamber upon inflation thereof, means at the other end of said tubular member for supplying air pressure to said balloon through said tubular member and control valve means for selectively connecting said air pressure means to said balloon for inflating the latter to bear upwardly against the valves and for subsequently venting the tool to deflate the same and withdraw the balloon, and means for connecting the tool to the spark plug opening.

2. An automotive tool according to claim 1 wherein said tubular member is generally flexible.

3. An automotive tool according to claim 1 wherein said control valve means comprises a check valve permitting air flow from said air pressure means to said tubular member but preventing retrograde flow and a manually controllable vent valve between said check valve and said balloon which is selectively closed to connect the tubular member from said check valve to said balloon for inflating the latter and which is opened to vent said tubular member to deflate said balloon.

4. An automotive tool according to claim 2 wherein said control valve means comprises a check valve permitting air flow from said air pressure means to said tubular member but preventing retrograde flow and a manually controllable vent valve between said check valve and said balloon which is selectively closed to connect the tubular member from said check valve to said balloon for inflating the latter and which is opened to vent said tubular member to deflate said balloon.

5. An automotive tool according to claim 1 wherein the connection between said tubular member and said balloon comprises threaded means engageable with the threads of the spark plug opening.

6. An automotive tool according to claim 2 wherein the connection between said tubular member and said balloon comprises threaded means engageable with the threads of the spark plug opening.

7. The method of retaining overhead valves of an internal combustion engine in raised position while work is being performed on the valve operating mechanism which method comprises inserting an inflatable balloon in a spark plug opening of a cylinder of said engine, inflating the same to bear against said valves and retain the same in raised position while the work is being performed, and finally, deflating and removing said balloon when the work has been completed.

* * * * *